United States Patent Office 3,193,506
Patented July 6, 1965

---

3,193,506
DETERGENT COMPOSITION, NON-CORROSIVE TO METAL SURFACES
Louis A. Joo, Crystal Lake, Ill., assignor to The Pure Oil Company, Chicago, Ill., a corporation of Ohio
No Drawing. Filed Nov. 29, 1961, Ser. No. 155,835
3 Claims. (Cl. 252—138)

This invention relates to the use of halogenated, polynuclear, alkaryl carboxylic acids as corrosion inhibitors and more particularly to corrosion-inhibiting compositions containing a new class of highly halogenated, complex, polynuclear, aromatic carboxylic acids prepared from solvent extracts obtained in the solvent extraction of mineral lubricating oils. More specifically, the invention is based on the discovery that the mono-, di- or polycarboxylic acids, or their mixtures described in copending application Serial No. 819,932, filed June 12, 1959, by Thomas W. Martinek (now abandoned), and application Serial No. 79,661, filed December 12, 1960, by W. Kramer et al., now United States Patent No. 3,153,087, though known to contain double bonds, when halogenated (in accordance with another copending application Serial No. 50,334, filed August 18, 1960 by Joo et al., now United States Patent No. 3,056,773) produce a product having about 2 to 3 or more times as much halogen than that which would be predicted, and the product quite unexpectedly is a corrosion inhibitor.

Metal surfaces are easily oxidized and corroded by contact with aerated aqueous solutions of detergents. Organic compounds containing nitrogen, oxygen, sulfur and other members of Groups V and VI of the Periodic Table, such as amines, mercaptans, heterocyclic nitrogen compounds, substituted ureas and thioureas, etc., are widely used to inhibit such corrosion. Heavy-metal salts of the same acids are effective corrosion inhibitors. In certain isolated instances other acids are used alone for the same purpose.

Now, in accordance with this invention, I have discovered that the halogenated "extract carboxylic acids" are also effective corrosion inhibitors in such systems. This discovery was very unexpected in view of the fact that organo-halogen compounds in general can be considered as conducive to corrosion.

It becomes then a primary object of this invention to provide new corrosion inhibitors comprising halogenated, carboxylic, polynuclear, aromatic acids derived from the carboxylic, polynuclear, aromatic acids disclosed in said copending applications.

Another object of this invention is to provide highly halogenated, carboxylic, polynuclear, aromatic acids of the general formula:

$$R-(COOH)_a$$
$$|$$
$$(X)_y$$

wherein R is the residue or reactable portion of solvent extracts and is composed of compounds characterized by complex, polynuclear, aryl and alkaryl, and/or heterocyclic nuclei, $a$ represents the number of carboxyl groups attached thereto, $a$ having a value of at least 1 and preferably 2–5, X is a halogen (i.e., chlorine, bromine, iodine, fluorine, or mixtures thereof), and $y$ is the number of halogen atoms attached to the residual group, $y$ having a value of about 1 to 5, as corrosion inhibitors for aerated aqueous media, especially aerated solutions of commercial detergent compositions.

These and other objects of this invention will be described or become apparent as the specification proceeds.

THE STARTING MATERIALS

The starting materials for the instant invention are prepared from petroleum fractions, particularly solvent extracts rich in complex, polynuclear, aromatic compounds in acordance with said copending application Serial No. 819,932 (now abandoned) and United States Patent No. 3,153,087. The petroleum fractions rich in the above-defined complex hydrocarbons are aromatic-rich fractions obtained as by-products from the solvent refining of material oils.

For example, a preferred source of the above-defined complex hydrocarbons comprises the extracts obtained in solvent refining mineral oils, particularly lubricating oil fractions. These extracts, hereinafter referred to as solvent extracts, are obtained as the extract or solvent phase when lubricating oils are refined by treatment with a selective solvent having an affinity for aromatic and sulfur compounds. The complex hydrocarbons removed by this refining treatment often contain appreciable amounts of combined sulfur, nitrogen and oxygen. These complex hydrocarbons contain a predominance of polynuclear rings of aromatic structure, and of condensed configurations having or containing hydrocarbon substituent groups attached thereto as side chains. These starting materials are of a generally viscous nature, have low viscosity indices, low resistance to oxidation, and are considered to be deleterious in lubricating oils. Heretofore, these aromatic extracts have been regarded as waste products, and because they are exceedingly complicated mixtures of complex compounds, including various sulfur-, oxygen-, and nitrogen-containing compounds, they have not been used successfully in preparing petrochemicals or as sources of hydrocarbon reactants or starting materials.

Since the general process of refining mineral lubricating oils in which solvent extracts are obtained is well known, it is only necessary for present purposes to describe these materials generically as solvent extracts from the solvent refining of mineral lubricating oils and give the following examples.

*Table I.—Sources and physical characteristics of solvent extracts*

| Ext. No. | Crude source | Solvent | API grav. | Sp. gr. at 10° F. | Vis./100° F. | Vis./130° F. | Vis./210° F. | V.I. | ° F. pour | ° F. flash | ° F. fire | Iodine No. (Wijs) | Percent C.R. | Percent sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.66 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +60 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.88 |
| 9 | Santa Fe Springs | do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.1 | | |
| 11 | Penn | Chlorex | 12.2 | 0.9843 | | | 1,365 | | +85 | 560 | 630 | 71.4 | | |
| 12 | do | Nitrobenzene | 10.0 | 1.000 | | | 1,500 | | +75 | 555 | 640 | 60 | | |
| 13 | Mid-Cont | Propane-cresol | 14.4 | 0.9699 | | | 1,500 | | +100 | 540 | 605 | 63.7 | | |
| 14 | do | Phenol | 13.6 | | | | 41.7 | −82 | +20 | | | | | |
| 15 | do | Chlorex | 13.6 | | | | 200 | −61 | +75 | | | | | |
| 16 | do | Phenol | 8.9 | | | | 569 | | +75 | | | | | |
| 17 | do | Furfural | 14.9 | | | | 50.2 | 25 | +20 | | | | | |
| 18 | East Tex | Phenol | 13.5 | 0.976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 23 | do | do | | | | | | −55 | +70 | | | | 1.1 | 2.75 |
| 41 | do | do | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 Vis. neutral, had an average molecular weight of 300, and contained 76.8% aromatics (by the silica gel procedure).

Extract No. 42 was obtained in the production of 150 Vis. Bright Stock, had an average molecular weight of 590, contained 86% aromatics, 14% saturates, 86.2% carbon, 11.4% hydrogen, and averaged 3.3 aromatic rings per aromatic molecule.

Extract No. 43 was obtained in the production of 170 Vis. neutral, had an average molecular weight of 340, contained 87.0% aromatics, 13% saturates, 86.4% carbon, 10.7% hydrogen, and averaged 2.7 aromatic rings per aromatic molecule.

Extract No. 44 was obtained in the production of 200 Vis. neutral, had an average molecular weight of 340, contained 87% aromatics, and 13% saturates.

Extract No. 45 was obtained in the production of 160 Vis. Bright Stock, contained 92% aromatics and 8% saturates.

These starting materials have the following general properties and characteristics:

*Table II*

| Characteristic: | Range of value |
|---|---|
| Gravity, ° API | 7.3–18.3 |
| Gravity, sp., 60/60° F. | 0.9446–1.0195 |
| Viscosity SUS at 210° F. | 40–1500 |
| Viscosity index | minus 153–plus 39 |
| Pour point, ° F. | 20–115 |
| Color, NPA | +2–5D |
| Molecular weight, average | 300–600 |
| Sulfur, percent wt. | 1.9–4.5 |
| Nitrogen, percent wt. | Below 1 |
| Aromatic compounds, percent (including heterocyclics) | 75–98 |
| Av. No. of rings/mean arom. mol. | 1.7–3.5 |

The complexity of the types of compounds present, as based on these analyses, is illustrated by the following table:

*Table III.—Estimated chemical composition of solvent extracts Nos. 19 and 21 of Table I*

| Type of compound: | Approx. percent in the extract |
|---|---|
| Saturated hydrocarbons | 12.5 |
| Mononuclear aromatics: | |
|   Substituted benzenes | 25.0 |
| Dinuclear aromatics: | |
|   Substituted naphthalenes | 30.0 |
| Trinuclear aromatics: | |
|   Substituted phenanthrenes | 10.0 |
|   Substituted anthracenes | 5.0 |
| Tetranuclear aromatics: | |
|   Substituted chrysenes | 00.5 |
|   Substituted benzphenanthrenes | 0.2 |
|   Substituted pyrenes | 0.2 |
| Pentanuclear aromatics: | |
|   Perylene | 0.01 |
| Sulfur compounds,* nitrogen and oxygen compounds, etc. | 16.5 |

* Mainly heterocyclic compounds. The average mol wt. of Extracts 19 and 21 is 340, and that of Extract 20 is 590.

Any portion of the reactive aromatic constituents in solvent extracts may be isolated therefrom, or from other sources, to be used as starting materials for the reaction with a halogen in accordance with this invention. For example, solvent extracts may be distilled and selected fractions thereof used as the starting materials. The content of reactive, complex, polynuclear, aromatic compounds and heterocyclics present in solvent extracts, as illustrating the preferred source material, may vary depending on the type of solvent, the extraction process applied, and the mineral oil treated, although the general types of compounds present in the extract are not so varied. Extracts containing from about 30% to 90% of polynuclear aromatics and heterocyclics of aromatic nature represent a preferred type of starting material.

THE HALOGENATED COMPLEX CARBOXYLIC ACIDS

The free, complex, carboxylic acids or acid mixtures to be halogenated and used in accordance with this invention are prepared in accordance with the processes disclosed in said copending applications, Serial No. 819,932, and Serial No. 79,661. These acids are further described in related copending applications, Serial No. 79,541, filed December 30, 1960, by Messrs. W. E. Kramer and L. A. Joo, now United States Patent No. 3,154,507, and Serial No. 79,506, filed December 30, 1960, by Thomas W. Martinek.

The complex, polynuclear, aromatic, and alkaromatic mono-, di-, and polycarboxylic acids are derived by metalation, carbonation and acidification of a source of complex, polynuclear, aromatic nuclei, namely, solvent extracts and related materials.

Since the preferred source material, namely, solvent extracts from the manufacture of mineral lubricating oils, does not lend itself to economical production of the desired complex acids using the prior art methods, the preferred methods of preparation set forth in said copending applications will be described and the properties of the acids set forth as examples. The details of these processes as described in said copending applications are incorporated herein by reference.

One procedure is to react about 30 parts of a petroleum fraction rich in complex polynuclear aromatics, as exemplified by solvent extracts, with 1 to 5 parts of an alkali metal, such as sodium, potassium, cesium, lithium, and rubidium, and their mixtures and amalgams, at a temperature of about −60° to 80° C. in the presence of a reaction solvent such as dimethyl glycol ether, dimethyl ether, methylalkyl ethers, tetrahydrofuran, methyl ethyl ketone, methylal, and trimethylamine. The formation of the adduct is promoted by shearing agitation, providing an excess of alkali metal, using a pre-formed dispersion of the alkali metal in an inert solvent, or using a pre-formed dispersion of the alkali metal in a portion or all of the solvent extract. These techniques overcome the induction period of the reaction due to impurities, including sulfur compounds present therein, which tend to coat the alkali metal particles and prevent the reaction or prolong the induction period. A Brookfield counter-rotating stirrer is used to give continuous shearing and expose fresh metal surfaces during the reaction. Color changes indicate the progress of the reaction.

The alkali-metal adduct thus formed is either separated or left in the unreacted oil, and the mixture is treated with excess gaseous or solid carbon dioxide at temperatures ranging from about −20° C. to −80° C., causing a discharge of the color. This forms the alkali-metal salt of the complex acid which, upon acidification with a mineral acid, yields the desired complex, polynuclear carboxylic acids in good yields. To illustrate, the following non-limiting example is given.

EXAMPLE I.—PREPARATION OF THE FREE ACIDS

One hundred gms. of solvent extract from the preparation of 170 vis., 100 VI neutral oil, dissolved in 675 cc. of dry tetrahydrofuran was reacted with agitation at 10° to 30° C. with 8.3 gms. of metallic sodium in the form of 3/16″ cubes. After 25 minutes, adduct-formation began and a strong color change took place. The product was cooled to −60° C. while an excess of carbon dioxide gas was introduced, resulting in a discharge of the color without precipitation. The 5.1 gms. of unreacted sodium was removed, the tetrahydrofuran was vacuum-stripped, and the remaining liquid combined with ether and water-washed. Acidification of the aqueous phase results in the separation of the desired acids.

EXAMPLE II.—PREPARATION OF THE HALO-ACIDS

A 20-g. portion of carboxylic, polynuclear, aromatic acids, which had been prepared by reacting an aromatic-rich extract oil (No. 23 of Table I) with metallic sodium in the presence of an active solvent, then reacting the metal-organic adduct with carbon dioxide, and finally acidifying the water-soluble products thereof to obtain the free acids, was dissolved in 400 ml. of glacial acetic acid and 20 ml. of concentrated hydrochloric acid and 7.5 ml. of 30% hydrogen peroxide were added. The reaction mixture was boiled occasionally during a period of two hours, after which it was boiled vigorously for 20 minutes to drive off any oxygen and chlorine liberated by the reactions which had occurred. The resulting product was treated with 150 ml. of ether, and with several 200-ml. portions of water, to wash out the excess hydrochloric and acetic acids and effect an ether extraction of the chlorinated product, after which it was stripped free of the ether to recover the highly halogenated acid corrosion inhibitor of this invention.

The acids used in this experiment had an initial bromine number of 19, indicating that 0.119 gram-mole of halogen were reactive with the olefinic double bonds in 100 g. of the acid. The product obtained in the experiment contained 19% wt. chlorine, indicating that 0.33 gram-mole of chlorine had been incorporated per 100 g. of acid. Thus, it is apparent that the amount of chlorine which had been incorporated in the acid mixture was 2.75 times the amount which would have been predicted based only on the expected addition (bromine minimum) to the olefinic double bonds. At the same time, the sulfur content was reduced from 1.98% wt. to 1.6% wt., part of this reduction being merely apparent and resulting from the increase in molecular weight caused by the incorporation of chlorine. But part of the reduction was real and resulted from some mechanism which remains unexplained at this time. The acid number of the material was diminished by only the amount expected from the increase in molecular weight brought about by the incorporated chlorine. Because of these changes, it was unexpected that this material would act as a corrosion inhibitor.

EXAMPLE III

A 20-g. portion of carboxylic, polynuclear, aromatic acids, which had been prepared by the reaction of an aromatic-rich extract oil (No. 23 of Table I) with metallic sodium in the presence of an active solvent, then reacting the metal-organic adduct with carbon dioxide, and finally acidifying the water-soluble products thereof to obtain the free acids, is dissolved in 400 ml. of glacial acetic acid and 20 ml. of concentrated hydrobromic acid, and 7.5 ml. of 30% hydrogen peroxide are added. The reaction mixture is boiled occasionally during a period of two hours, after which it is boiled vigorously for 20 minutes to drive off any oxygen and bromine liberated by the reactions which occur. The resulting product is extracted with 150 ml. of ether, after which it is stripped free of the ether and acetic acid to recover the highly halogenated acid mixture to be used in accordance with this invention.

The acids for such an experiment have an initial bromine number of about 19, indicating that 0.119 gram-mole of halogen would be reactive with the olefinic double bonds in 100 g. of the acid. The product from such an experiment contains about 34.5% by weight of bromine, indicating that 0.33 gram-mole of bromine is incorporated per 100 g. of acid. Thus, it is apparent that the amount of bromine which is incorporated in the acid mixture is 2.75 times the amount which would have been predicted, based only on the expected addition bromine number to the olefinic double bonds. At the same time, the sulfur content is reduced from 1.98% wt. to 1.3% wt., part of this reduction being merely apparent and resulting from the increase in molecular weight caused by the addition of bromine atoms. But part of the reduction is real and results from some mechanism which remains unexplained at this time. As previously, the acid number of the material is diminished by only the amount expected from the increase in molecular weight brought about by the bromine incorporated. The corrosion-inhibiting properties thereof (to be demonstrated) were therefore unexpected.

EXAMPLE IV

A 20-g. portion of carboxylic, polynuclear, aromatic acids, which had been prepared by reacting an aromatic-rich extract oil (No. 22 of Table I) with metallic sodium in the presence of an active solvent, then reacting the metal-organic adduct with carbon dioxide, and finally acidifying the water-soluble products thereof to obtain the free acids, is dissolved in 400 ml. of glacial acetic acid and 20 ml. of concentrated hydroiodic acid, and 7.5 ml. of 30% hydrogen peroxide are added. The reaction mixture is boiled occasionally during a period of two hours, after which it is boiled vigorously for 20 minutes to drive off any oxygen and iodine liberated by the reactions which occur. The resulting product is extracted with 150 ml. of ether, after which it is stripped free of the ether and acetic acid to recover the highly halogenated acid mixture.

The acids for this experiment have an initial bromine number of about 19, indicating that 0.119 gram-mole of halogen would be reactive with the olefinic double bonds in 100 g. of the acid. The product from such an experiment contains 45.0% by wt. iodine, indicating that 0.33 gram-mole of iodine is incorporated per 100 g. of acid. Thus, it is apparent that the amount of iodine which is incorporated in the acid mixture is 2.75 times the amount which would have been predicted based only on the expected addition (bromine number) to the olefinic double bonds. At the same time, the sulfur content is reduced from 1.98% wt. to 1.1% wt., part of this reduction being merely apparent and resulting from the increase in molecular weight caused by the addition of iodine atoms.

EXAMPLE V

One hundred and fifty-four grams of the bromoacid prepared in Example II is heated with 100 grams of KF for two hours, with stirring. After cooling, the acid is extracted from the mixture with diethyl ether. The ether is evaporated to yield the free acid. The product after reaction weighs about 113 grams. Analysis for fluorine reveals 11.5% fluorine, or 0.33 mole of fluorine present per 100 grams of acid. The chloro or iodoacids also can be used in this reaction to prepare the fluoroacids. Similar results are obtained with Extracts Nos. 1–8 of Table I.

The resulting halogenated complex acids, hereinafter referred to as halogenated extract carboxylic acids or halo-EPA, are mixtures of mono-, di-, and polycarboxylic acids containing about 1 to 5 atoms of halogen per molecule. Through chemical analysis, characterization and study of the physical and chemical properties, by way of illustration only, the halogenated extract carboxylic acids can be represented by the following formulae:

Halogenated monobasic acids

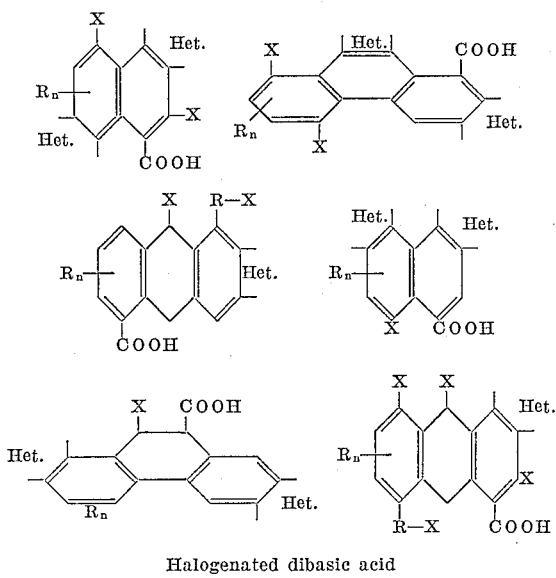

Halogenated dibasic acid

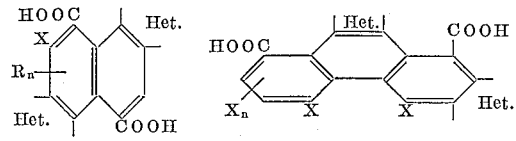

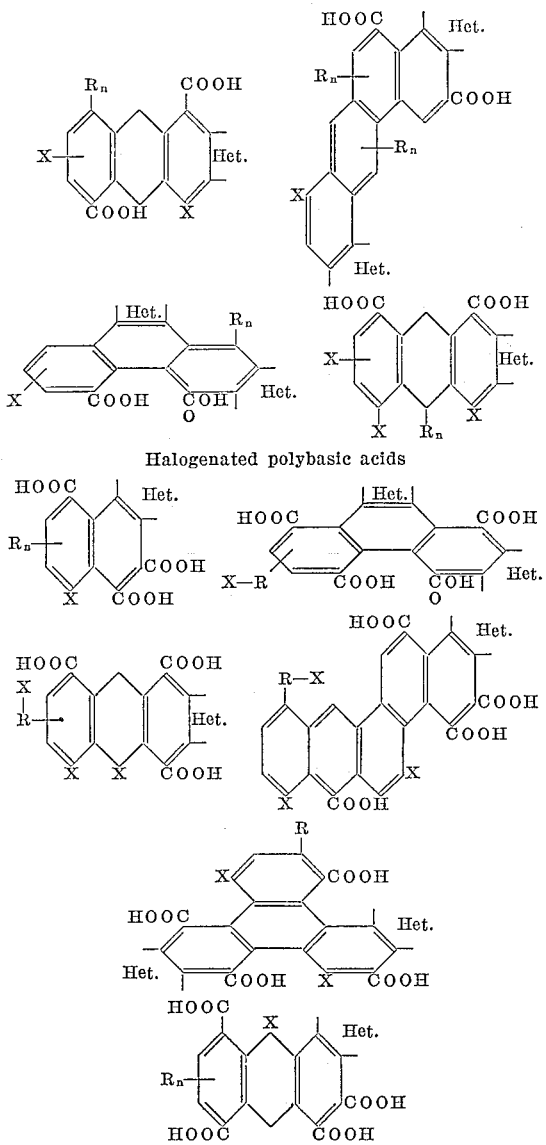

Halogenated polybasic acids wherein Het. illustrates one or more S-, N-, or O-containing heterocyclic ring substituents, and may contain one or more halogen atoms, R is a saturated or unsaturated alkyl radical having a total of 15 to 22 carbon atoms for each nuclei, and $n$ has a value of 3 to 10. The molecular weight of the halogenated extract carboxylic acids ranges from about 320 to 1,000 and the average molecular weight is about 350 to 900. Table IV gives representative physical and chemical properties of the extract carboxylic acids that may be used in halogenated form in accordance with this invention.

Table IV

| Property: | Value |
|---|---|
| Acid No. | 170–280 |
| Melting point, ° C. | 80–90 |
| Bromine No. | 16–24 |
| Percent sulfur | 1.7–2.3 |
| Color | Deep red |
| Percent unsaponifiables | 2–6 |

In the mixture of Halo-EPA produced by metalation, carbonation and hydrolysis of solvent extracts, and halogenation, the mono-basic acid halo-derivatives constitute about 40% by volume, and the dibasic acid halo-derivatives, that is, those acids containing 2 to as high as 7 carboxyl groups, make up about 60% by volume. In the preferred embodiments of the invention, the mixture of acids, produced by metalation, carbonation and acidification of solvent extracts from the manufacture of refined mineral lubricating oils, is halogenated although fractions of such acids, such as those prepared by the method of copending application, Serial No. 161,355 may be halogenated and used.

The effectiveness of my inhibitors is demonstrated by the following series of experiments with aqueous solutions of "Tide," a commercial detergent composition containing mixed alkylaryl sulfonates, sodium tripolyphosphate, sodum sulfate, and other components. First, a water solution of "Tide" (0.5 g. detergent/100 ml. water) was prepared and divided into several flasks. A portion of halogenated extract carboxylic acid (EPA) was added to one of the solutions in an amount equivalent to 0.1 g./100 ml. solution. However, because the acid was only sparingly soluble in water, it did not dissolve completely. I estimate that the actual concentration of this halogenated acid in solution was in the range of about 0.01 g./100 ml. Finally, two brass strips (½" x 3") were placed in the solutions in each flask, and air was bubbled through the solutions at a rate of 20–30 ml./min. for a period of 72 hours while the temperature was maintained at 70° C. The weight losses from the brass strips were as follows:

*Table V.—Evaluation of chlorinated extract acid as corrosion inhibitors*

| Inhibitor | Weight loss [1] (grams) | Weight loss [1] (percent) |
| --- | --- | --- |
| None | 0.0270 | 1.98 |
| Chlorinated EPA | 0.0018 | 0.13 |
| EPA of Example I | 0.0025 | 0.18 |

[1] Average of two coupons.

In accordance with said application Serial No. 50,334, various known methods of introducing halogen atoms into organic compounds may be used to prepare the halo-EPA used herein. Since the complex organic compounds used as starting materials apparently have several function sites which are vulnerable to attachment of a halogen atom, direct halogenation may be used. However, in using this method, there is the inconvenience of handling free halogen. The reaction may be conducted slowly at room temperature, or may be accelerated by the use of heat and light. Direct halogenation proceeds rapidly in the vapor phase. In general, substitution occurs most readily with tertiary hydrogens in the complex molecule and least at primary positions. At elevated temperatures, these types of substitution approach equality, as in the halogenation of alkanes. The alkene portions of the molecule produce alkyl-type monohalide linkages when directly halogenated at elevated temperatures. Side chains attached to aromatic nuclei can be directly halogenated in sunlight and in the absence of a catalyst. Nuclear halogenation can be accomplished by use of bromine, iodine, or chlorine at temperatures of from 300 to 500° C. Direct bromination or chlorination may be conducted using red phosphorus or phosphorus halides as carriers. Peroxide-catalyzed chlorination with sulfuryl chloride is another technique that may be used. The reaction of hydrogen halides with unsaturates constitutes a convenient method of preparing the derivatives of this invention. Such reactions with hydrogen bromide or hydrogen iodide take place at room temperature to 100° C., but the addition of hydrogen chloride requires temperatures from 75 to 200° C. In these reactions, such solvents as benzene, pentane and ether may be used.

Because of the complex nature of the acid starting materials for the halogenation reactions, and the distinguishing features of the aromatic starting materials as shown in Tables I and II, a feature of the invention is the discovery that these complex materials function as corrosion inhibitors. The average bromine number of the acids is between about 16 to 22. Theoretically, this would mean that about 13.8 to 18.0 wt. percent of bromine could be introduced if the bromine adds to the olefinic double bonds. The bromine content is about 2.75 times these amounts. Since the starting material is a mixture of complex, polynuclear, aryl and/or alkaryl compounds, and there is no loss due to decarboxylation or dealkylation during the reaction, those products which apparently have only one halogen atom per molecule are still defined as polyhalo because they constitute a mixture with more than one type of product. The R group is defined as a residue of a solvent extract having at least one active site. This means that there is at least one and preferably more than one position in the molecule or molecules of the acids which will accept a halogen atom. Accordingly, although some of the individual acids in the final product mixture may contain only one halogen atom, the mixture may still be considered polyhalogenated because other individual acid molecules contain more than one halogen atom. Y in the formulae herein may have a value of 2 to 5 for the average polyhalogenated compositions.

In addition to the general physical and chemical properties of the solvent extracts given in Table II, these starting materials may be further characterized by the fact that their boiling point (initial) is between 300 to 1000° F., the end boiling point is between 400 to 1200° F. The extracts may contain from about 15% to 50% by weight of sulfur compounds, and 30% to 90% by weight of aromatic and thio compounds. Many of these characteristics, particularly the chemical characteristics, carry over into the polynuclear polyhaloacids used herein.

The terms residue of solvent extracts and reactable portion of solvent extracts have been used synonymously herein to mean the complex organic portion of the extracts resulting from metalation, carbonation, and acidification, in accordance with the processes of applications Serial Numbers 819,932 and 79,661, exclusive, of carboxyl groups.

The corrosion inhibitors of this invention are used in the same manner as prior art corrosion inhibitors are used to combat the deterioration of metal surfaces in contact with a corrosive environment. The metal surfaces to be protected may be ferrous metals, alloys, plated metals, tin, iron, aluminum, brass, copper, bearing metals, castings, machine parts and the like which are in contact with aqueous environments, aerated aqueous environments, or aerated aqueous commercial-detergent environments. The corrosive atmospheres counteracted by the corrosion inhibitors of this invention may contain acids, alkali, salts, organic materials, solvents, water and emulsifiers, ordinary soaps, modern detergents, and the like. The corrosion inhibitors of this invention are particularly effective against the corrosive action of aerated aqueous solutions, that are used in many processes, and are also particularly effective against the corrosive action of aqueous solutions of synthetic detergents and emulsifiers.

Examples of the synthetic detergents and emulsifiers that can be present in the aqueous environments to be protected by the corrosion inhibitors of this invention are dodecylbenzene sulfonic acid, salts of fatty acid tertiary amines, alkylaryl sulfonates, alkylaryl sulfonates having molecular weights of 465 to 480, alkylaryl polyether alcohols, polyglycol esters, disodium N-octadecylsulfosuccinamate, diamyl ester of sodium sulfosuccinic acid, alkali metal petroleum sulfonates, alkaline earth metal petroleum sulfonates, fatty amides, blends of alkalis and detergents, polyoxyethylated nonylphenols, polyoxyalkylene esters and sulfonates, and the like, which are either of anionic, nonionic, or cationic type. These detergents and emulsifiers are used in textile processing, electroplating, car washing, metal pickling, grease emulsifiers, emulsion paints, adhesives, cleaning compositions, dishwashing compositions, and the like. The corrosion inhibitors of this invention find application in the preparation, handling, and use of these types of detergent compositions.

This invention encompasses corrosion inhibitors prepared by the reaction of solvent extracts with an alkali metal followed by carbonation, acidification and halogenation, and corrosion inhibitors prepared by transformation of the halogenated product to a partially or wholly neutralized salt. The invention also encompasses corrosion inhibitors of Formulae 1, 2 and 3 herein which can be summarized as compounds of the formula,

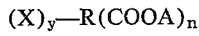

wherein R represents the complex nuclei derived from solvent extracts, A is hydrogen or the hydrogen equivalent of a metal, and $n$ has a value of 1 to 5 or more, and compounds of the formula,

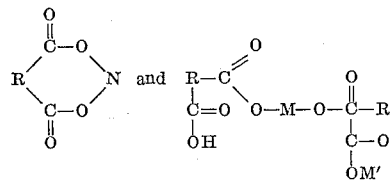

where M and M' are the same or different metals.

The embodiments of the invention in which an exclusive property or privilege is claimed are defined as follows:

1. A detergent composition, non-corrosive to metal surfaces in contact therewith in the presence of air consisting essentially of a major portion of an aqueous solution of mixed alkylaryl sulfonates, sodium tripolyphosphate, and sodium sulfate and as the sole corrosion-inhibiting component about 0.01 g. per 100 ml. of said aqueous solution of a halo, polynuclear carboxylic acid prepared by reacting solvent extracts, obtained in the solvent refining of mineral lubricating oils with a solvent selective for aromatic compounds, with an alkali metal to form the alkali metal adduct, carbonating said adduct to form the alkali metal salt of said acid, acidizing the resulting salt to form the free carboxylic acid characterized by complex polynuclear aryl, alkaryl nuclei having an average molecular weight of above about 300 with about 1.7 to 3.5 aromatic rings per mean aromatic molecule and said acid contains 1 to 5 halogen atoms and 1 to 5 carboxyl groups per molecule and halogenating said free acid.

2. A detergent composition in accordance with claim 1 in which said halogen is chlorine.

3. The process of protecting brass against corrosion by an air-agitated aqueous solution of mixed alkylaryl sulfonates, trisodium polyphosphate and sodium sulfate which comprises adding to said solution as the sole corrosion-inhibiting component a soluble amount of about 0.01 g. per 100 ml. of said solution of a chloro, polynuclear carboxylic acid prepared by reacting phenol extract, obtained in the phenol extraction of mineral lubricating oils with sodium to form the sodium adduct, carbonating said sodium adduct to form the sodium salt of the corresponding carboxylic acid, acidizing the resulting sodium salt to form the free carboxylic acid characterized by complex polynuclear aryl, alkaryl nuclei having an average molecular weight of above about 300 with about 1.7 to 3.5 aromatic rings per mean aromatic molecule and said acid contains 1 to 5 halogen atoms and 1 to 5 carboxyl groups per molecule and chlorinating said acid.

References Cited by the Examiner

UNITED STATES PATENTS

| | | | |
|---|---|---|---|
| 2,806,867 | 9/57 | Barnhart et al. | 252—389 |
| 3,056,773 | 10/62 | Joo et al. | 260—128 |
| 3,058,996 | 10/62 | Prill | 252—396 |

JULIUS GREENWALD, *Primary Examiner.*